United States Patent [19]
Lauw

[11] Patent Number: 5,534,051
[45] Date of Patent: Jul. 9, 1996

[54] SPECIFIC DYE SET FOR THERMAL INK-JET PRINTING

[75] Inventor: Hiang P. Lauw, Corvallis, Oreg.

[73] Assignee: Hewlett-Packard Company, Palo Alto, Calif.

[21] Appl. No.: 500,759

[22] Filed: Jul. 11, 1995

[51] Int. Cl.⁶ .................................. C09D 11/02
[52] U.S. Cl. ................... 106/22 R; 106/22 H; 106/20 D
[58] Field of Search ..................... 106/22 R, 22 H, 106/20 D

[56] References Cited

U.S. PATENT DOCUMENTS

| | | | |
|---|---|---|---|
| 4,685,968 | 8/1987 | Palmer | 106/22 R |
| 4,761,180 | 8/1988 | Askeland et al. | 106/22 R |
| 4,786,327 | 11/1988 | Wenzel et al. | 106/22 R |
| 4,963,189 | 10/1990 | Hindagolla | 106/22 K |
| 5,085,698 | 2/1992 | Ma et al. | 106/20 R |
| 5,143,547 | 9/1992 | Kappele | 106/22 R |
| 5,145,519 | 9/1992 | Kappele | 106/22 R |
| 5,185,034 | 2/1993 | Webb et al. | 106/22 R |
| 5,198,023 | 3/1993 | Stoffel | 106/22 R |
| 5,221,334 | 6/1993 | Ma et al. | 106/20 R |
| 5,273,573 | 12/1993 | Kappele | 106/22 R |
| 5,302,197 | 4/1994 | Wickramanayke et al. | 106/20 R |
| 5,395,434 | 3/1995 | Tochihara et al. | 106/22 R |
| 5,476,541 | 12/1995 | Tochihara | 106/22 R |

*Primary Examiner*—Helene Klemanski

[57] ABSTRACT

A specific dye set is provided for use with thermal ink-jet color printers, such as Hewlett-Packard Company's DeskJet® printer. The dye set comprises Direct Blue 199 and Acid Blue 9 (cyan), Reactive Red 180 and Acid Red 52 (magenta), and Acid Yellow 23 (yellow), of which Direct Blue 199 is treated to replace its associated sodium or ammonium cation with tetramethylammonium (TMA) cation. The present dye set enables an ink-jet color printer to produce high-quality color images in a reliable manner less encumbered by the potential for crusting and precipitation of dye salt deriving from the use of Direct Blue 199 dye as associated with sodium or ammonium in the presence of a high inorganic salt content (3 to 11 wt %), which is used to control bleed between black and the color inks.

20 Claims, No Drawings

SPECIFIC DYE SET FOR THERMAL INK-JET PRINTING

CROSS-REFERENCE TO RELATED APPLICATION

The present application is related to application Ser. No. 08/501,262, filed Jul. 11, 1995 (PD-10950152-1), which discloses and claims the ink-jet ink set for which the present application provides an improved cyan ink.

TECHNICAL FIELD

The present invention relates to ink compositions for thermal ink-jet printing, and, more particularly, to a specific dye set suitable for use in a color printer such as Hewlett-Packard's DeskJet® printer.

BACKGROUND ART

In commercially-available thermal ink-jet color printers, such as the DeskJet® printer available from Hewlett-Packard Company, a color spectrum is achieved by combining yellow, magenta, and cyan inks in various proportions. The yellow, magenta, and cyan inks derive their hues from yellow, magenta, and cyan dyes, respectively. The particular set of dyes so employed constitutes a so-called "dye set".

In aqueous-based ink compositions, ink is formulated by dissolving dye in an ink vehicle. For example, a cyan ink would comprise a cyan dye dissolved in an ink vehicle. The dye molecules employed in ink-jet ink compositions are often in the form of dye salts made of a dye anion and a cation such as sodium. These dyes are designed to form solids in the target paper substrate by way of crystallization of the dye salt.

While the tendency of the dye salts to crystallize is a necessary element of ink-jet printing, it becomes problematic if the dye salt crystallizes prematurely in the ink-jet printhead about the orifice. As is known, thermal ink-jet printers employ resistors to eject droplets of ink through an orifice toward the paper substrate. During periods of pen inactivity, dye salts may crystallize in and about the orifice at its interface with the air, thereby clogging the orifice. The undesirable crystallization of dye salts about the orifice is termed "crusting" and results in the misdirection of ink droplets given a partial blockage of the orifice or even the prevention of ink droplet ejection given a complete blockage of the orifice.

It is known that the choice of cation associated with the dye anion may reduce the amount of crusting of dye salts; see, e.g., U.S. Pat. No. 4,761,180, entitled "Dyes Containing Tetramethylammonium Cation for Ink-Jet Printing Inks", assigned to the present assignee. Commercially-available anionic dye salts are often associated with such cations as sodium and ammonium, which increase the tendency of anionic dye salts to crust about the orifice. The replacement of these cations with such cations as lithium and tetramethylammonium is known to reduce crusting problems associated with certain dyes.

The choice of cation to associate with the anionic dye is all the more crucial with the recent development of inks having large amounts of inorganic salts. New generation inks employ inorganic salts to prevent the bleed of black ink into color ink. Bleed occurs as colors mix both on the surface of the paper substrate as well as within the substrate itself. It is desirable to have a border between colors that is clean and free from the invasion of one color into the other. For example, in U.S. Pat. No. 5,198,023, issued Mar. 30, 1993 and assigned to the present assignee, multivalent cations such as calcium chloride and magnesium chloride are added at concentrations ranging from about 1 to 10 wt % to yellow cationic inks to prevent bleed between yellow and black inks. The co-presence of this magnitude of inorganic salts along with certain anionic dyes, notably Direct Blue 199 ("DB 199"), precludes the association of DB 199 with undesirable cations such as sodium and ammonium, which tend to precipitate in the presence of a sufficient amount of inorganic salts.

Thus, the formulation of a specific dye set for purposes of thermal ink-jet color printing requires consideration of numerous variables. For example, the dye set employed must produce vivid, true colors of a wide spectrum when jetted onto the specially-coated paper typically employed in such color printers; see, e.g., U.S. Pat. No. 5,273,573, entitled "Specific Dye Set for Thermal Ink-Jet Printing on Paper", assigned to the present assignee. Moreover, care should be taken in the choice of cations associated with each of the dyes so that crusting about the orifice is minimized. Finally, the cation associated with an anionic dye should be suitable for use in inks having a relatively large amount of inorganic salts.

Thus, a need remains for a specific dye set that meets the above-described criteria. More particularly, a need remains to determine a cation for association with DB 199 anionic dye that will neither exhibit a tendency to precipitate in the presence of a relatively high concentration of inorganic salts nor contribute to crusting problems, all without sacrificing print quality.

DISCLOSURE OF INVENTION

In accordance with the invention, a specific dye set and method for printing with the dye set are provided. The dye set comprises a cyan ink deriving its coloration in part from Direct Blue 199 ("DB 199") anionic dye while also having a relatively large inorganic salt content, on the order of about 3 to 11 wt %. In the practice of the invention, the DB 199 anionic dye of the present dye set is treated to achieve an association with the cationic species tetramethylammonium. DB 199, in its commercially-available form, is typically associated with sodium or, less commonly, ammonium. The substitution of tetramethylammonium for sodium or ammonium offers several benefits. First, the association of tetramethylammonium cations with DB 199 reduces crusting of cyan ink about the orifice in comparison to the performance of DB 199 associated with sodium or ammonium. Second, whereas the high inorganic salt content of the cyan ink causes DB 199 associated with sodium or ammonium to precipitate out of the ink solution, the association of DB 199 with tetramethylammonium cations main-tains the solubility of DB 199 in the vehicle.

In addition to cyan ink, yellow, magenta, and black inks form a four-pen set employed in a method of thermal ink-jet color printing. The specific dye set utilized to formulate these four inks in accordance with the invention follows:

(a) a cyan ink containing cyan dye comprising Direct Blue 199 anionic dye and Acid Blue 9 anionic dye, the Direct Blue 199 anionic dye being associated with tetramethylammonium and the Acid Blue 9 anionic dye being associated with sodium;

(b) a magenta ink containing magenta dye comprising a mixture of Reactive Red 180 dye and Acid Red 52 anionic dye, the Reactive Red 180 dye being hydrolyzed and the Acid Red 52 anionic dye associated with lithium; and (c) a yellow ink containing yellow dye comprising Acid Yellow 23 anionic dye associated with tetramethylammonium;

(d) a black ink containing pigmented dye.

Each of the cyan, magenta, and yellow inks comprises about 0.1 to 4 wt % of dye; about 3 to 20 wt % of at least one diol; 0 to about 5 wt % of at least one glycol ether; about 3 to 9 wt % of 2-pyrrolidone; about 0.5 to 5 wt % of at least one component selected from the group consisting of surfactants, buffers, and biocides; about 3 to 11 wt % of at least one inorganic salt; and the balance water.

The specific dye set of the invention increases the reliability of thermal ink-jet color printers such as DeskJet® of Hewlett-Packard Company by reducing the crusting and precipitation of cyan ink deriving from the use of Direct Blue 199 dye associated with sodium or ammonium. Further, the dye set of the invention achieves higher reliability without adversely affecting color print quality.

BEST MODES FOR CARRYING OUT THE INVENTION

The invention described herein is directed to a specific dye set for use with thermal ink-jet color printers, such as Hewlett-Packard's DeskJet® printer. It enables an ink-jet color printer to produce high-quality color images in a reliable manner less encumbered by the potential for crusting and precipitation of dye salt deriving from the use of Direct Blue 199 dye associated with sodium or ammonium. More specifically, the Direct Blue 199 dye contained in the cyan ink of the specific dye set recited herein is treated to replace undesirable cations with tetramethylammonium (TMA). While sodium and ammonium are considered the primary examples of undesirable cations leading to crusting and precipitation of the DB 199 dye salt, there may be other cations associated with DB 199 as obtained from a dye manufacturer which may be beneficially replaced by TMA. It is considered within the scope of the present invention to replace any such undesirable cations associated with DB 199 anionic dye with TMA.

Together with a cyan ink composition, magenta, yellow, and black ink compositions are provided to form a complete set for use in four-pen color ink-jet printers such as the DeskJet® printer. The specific dye set employed in the practice of the invention to formulate these four inks is as follows: Direct Blue 199 and Acid Blue 9 (cyan); Reactive Red 180 and Acid Red 52 (magenta); and Acid Yellow 23 (yellow). Black ink is provided by either a dye-based ink or a pigment-based ink, as described in greater detail below.

The present cyan, magenta, and yellow ink compositions each comprise the following formula: (a) about 0.1 to 4 wt % of at least one dye; (b) about 3 to 20 wt % of at least one diol; (c) 0 to about 5 wt % of at least one glycol ether; (d) about 3 to 9 wt % of 2-pyrrolidone; (e) about 0.5 to 5 wt % of at least one component selected from the group consisting of surfactants, buffers, and biocides; (f) about 3 to 11 wt % of at least one inorganic salt; and (g) the balance water. The remaining components, excluding the dye component, together comprise the ink vehicle. The purity of all components is that employed in normal commercial practice for thermal ink-jet inks.

Diols suitably employed in the practice of the invention include any of, or a mixture of two or more of, such compounds as ethanediols (e.g., 1,2-ethanediol); propanediols (e.g., 1,2-propanediol, 1,3-propanediol, 2-ethyl-2-hydroxymethyl-1,3-propanediol, ethylhydroxypropanediol (EHPD), etc.); butanediols (e.g., 1,3-butanediol, 1,4-butanediol, etc.); pentanediols (e.g., 1,5-pentanediol); and hexanediols (e.g., 1,6-hexanediol, 2,5-hexanediol, etc.). Preferably, 1,5-pentanediol and EHPD are employed in the practice of the invention.

The glycol ether component of the ink vehicle may comprise any of the glycol ethers and thioglycol ethers commonly employed in the inks used in ink-jet printing, or a mixture thereof. Examples of such compounds include polyalkylene glycols such as polyethylene glycols (e.g., diethylene glycol, triethylene glycol, tetraethylene glycol, etc.); polypropylene glycols (e.g., dipropylene glycol, tripropylene glycol, tetrapropylene glycol, etc.); polymeric glycols (e.g., PEG 200, PEG 300, PEG 400, PPG 400, etc.); and thiodiglycol. Preferably, diethylene glycol is employed in the practice of the invention.

The preferred concentration of pentanediol and glycol component in each ink is given by the formula $$2\times[DEG]+[pentanediol]=about\ 6\ to\ 10\ wt\ \%,$$

where the square brackets denote the concentration in weight percent. For the more preferred cyan and magenta ink compositions, DEG is absent and 1,5-pentanediol is present in the range of about 7 to 9 wt %, and most preferably about 7.5 to 8.5 wt %. For the more preferred yellow ink composition, the amount of DEG ranges from about 3 to 5 wt % and most preferably about 3.5 to 4.5 wt %, with the balance 1,5-pentanediol.

EHPD is considered separately and is present in each ink in an amount in the range of about 6 to 9 wt %. For the cyan and magenta inks, EHPD is preferably present within the range of about 7 to 8 wt %, while for the yellow ink, EHPD is preferably present within the range of about 7.5 to 8.5 wt %.

The inorganic salt component of the present ink vehicle serves to prevent bleed between black ink and the color inks, and comprises one or more inorganic salts. The salts must, of course, be soluble in the ink in the concentration employed. Suitably-employed cations for the inorganic salt include alkaline earth metals of group 2A of the periodic table (e.g., magnesium and calcium); the transition metals of group 3B of the periodic table (e.g., lanthanum); cations from group 3A of the periodic table (e.g., aluminum); and lanthanides (e.g., neodymium). Preferably, calcium and magnesium are employed as cations in the practice of the invention. Suitably-employed anions associated with calcium include nitrate, chloride, acetate, benzoate, formate, and thiocyanate, while suitable anions associated with magnesium include nitrate, chloride, acetate, benzoate, bromide, citrate, formate, iodide, sulfate, fluoride, tartrate, and thiocyanate. Inorganic salts preferably employed in the practice of the invention are the nitrate, chloride, and acetate salts of calcium and magnesium. More specifically, the cyan and magenta inks of the present invention preferably employ magnesium nitrate while the yellow ink preferably employs calcium nitrate.

The other components of the present ink vehicle, namely, surfactants, buffers, biocides, and the like, are each commonly employed additives in thermal ink-jet ink compositions.

The purpose of the surfactant is to prevent color to color bleed by increasing the penetration of the inks into the print medium. Examples of surfactants that are preferably employed in the practice of the invention include secondary alcohol ethoxylates, which are nonionic surfactants, such as Tergitol 15-S-5 and Tergitol 15 -S-7, which are available from Union Carbide Co. (Houston, Tex.). Secondary alcohol ethoxylates are nonionic surfactants and are commercially-available, for example, from Union Carbide Co. (Houston, Tex.) as the Tergitol series, such as Tergitol 15-S-5 and Tergitol 15-S-7.

The secondary alcohol ethoxylates contain (a) an aliphatic chain having a prescribed number of carbon atoms in the chain and (b) a prescribed number of ethoxylated units. These ethoxylates are commercially available as mixtures of ethoxylates, and so are described in terms of the predominance of a given compound. Secondary alcohol ethoxylates suitably employed in the practice of the invention predominantly have about 12 to 18 carbon atoms in the aliphatic chain, while the number of ethoxylated units is predominantly in the range of 4 to 8 units, and preferably in the range of 5 to 7 units. Thus, "Tergitol 15-S-5" represents a secondary alcohol ethoxylate surfactant predominantly having 15 carbons in its aliphatic chain and 5 ethoxylated units. A mixture of secondary alcohol ethoxylates in which the predominant number of ethoxylated units is less than 4 is not very soluble in the ink, while if the predominant number of ethoxylated units is greater than 8, the surfactant loses effectiveness in preventing color bleed.

The amount of the secondary alcohol ethoxylate preferably employed in the practice of the invention is given by the sum of the two Tergitol components, 15-S-5 and 15-S-7, according to the formula

[15-S-5]+[15-S-7]=about 1 to 4 wt %, where the square brackets denote the concentration in weight percent. Preferably, Tergitol 15-S-5 alone is present in the cyan and magenta inks in the range of about 1.5 to 3 wt % and most preferably about 1.5 to 2.5 wt %. In the yellow ink, a mixture of the two Tergitols is preferably employed, with 15-S-5 ranging from about 0.5 to 2 wt % and 15-S-7 ranging from about 1 to 2 wt %; in the most preferred case for the yellow ink, 15-S-5 ranges from about 0.8 to 1.2 wt % and 15-S-7 ranges from about 1.3 to 1.7 wt %.

Optionally, a second surfactant component may be employed in the practice of the invention, namely diphenyl sulfonate derivatives, which are anionic surfactants. Rather than address the problem of bleed, the presence of this second surfactant serves to correct a sporadic problem that results in mis-directed drops of ink due to puddling of ink on the nozzle plate as a consequence of different surface energies on the nozzle plate. The anionic surfactant apparently creates a substantially uniform surface energy and thus reduces the potential for mis-directed drops. An example of a suitably employed diphenyl sulfonate derivative is Dowfax 8390, available from Dow Chemical (Midland, Mich.). Dowfax 8390 is a sodium n-hexadecyl diphenyl oxide disulfonate. Other sources of such diphenyl sulfonate derivatives include Pilot Chemical (Calfax 16L35), Olin Chemical (Polytergent 4C3), and Sandoz Chemical (Sandoz Sulfonate 2A1). A diphenyl sulfonate derivative may comprise up to about 0.4 wt % of the ink composition, and preferably comprises about 0.3 to 0.4 wt %.

Buffers employed in the practice of the invention to modulate pH should be organic-based biological buffers, since inorganic buffers would likely precipitate in the presence of the relatively large amount of inorganic salts in the ink composition. Further, the buffer employed should provide a pH ranging from about 6 to 9 in the practice of the invention. Examples of preferably-employed buffers include Trizma Base, which is available from, for example, Aldrich Chemical (Milwaukee, Wis.), and 4-mor-pholine ethane sulfonic acid (MES).

Any of the biocides commonly employed in ink-jet inks may be employed in the practice of the invention, such as NUOSEPT 95, available from Hüls America (Piscataway, N.J.); PROXEL GXL, available from ICI Americas (Wilmington, Del.); and glutaraldehyde, available from Union Carbide Company (Bound Brook, N.J.) under the trade designation UCARCIDE 250. PROXEL GXL is the preferred biocide.

Finally, another optional component that may be employed in the practice of the present invention is ammonium nitrate, which is used in conjunction with calcium-containing inorganic salts. Ammonium nitrate serves to prevent the precipitation of such calcium-containing inorganic salts in the ink upon exposure to the carbon dioxide in the air.

In the practice of the invention, cyan ink is formulated by combining purified Acid Blue 9 and Direct Blue 199 anionic dyes with the above-described ink vehicle, the latter dye being particularly known for providing high light fastness. Given the relatively high inorganic salt concentration in the cyan ink, Direct Blue 199 associated with sodium or ammonium would likely precipitate out of the vehicle. Thus, Direct Blue 199 is treated to substantially replace all or most of the as-supplied sodium or ammonium cation with TMA cation. The Acid Blue 9 anionic dye may remain associated with sodium in the practice of the invention. The substitution of TMA in Direct Blue 199 reduces crusting about the orifice attributable to cyan ink and enables the cyan ink to remain in solution in the presence of a relatively high concentration of organic salts. Since the Acid Blue 9 anionic dye may remain associated with sodium o in the practice of the invention, the amount of Acid Blue 9 must be limited such that the presence of its associated sodium cation does not undo the benefits achieved by replacing the sodium or ammonium cation of Direct Blue 199 with TMA. Preferably, Direct Blue 199 and Acid Blue 9 are employed at concentrations ranging from about 2 to 3 wt % and 1 to 2 wt %, respectively. More preferably, the ratio of the concentration of Direct Blue 199 dye to the concentration of Acid Blue 9 dye in the present cyan ink is about 2:1 by weight.

A variety of methods may be used to replace the sodium or ammonium ion associated with Direct Blue 199 with TMA. Examples of such ion-exchange processes are disclosed in U.S. Pat. Nos. 4,685,968 and 4,786,327, both assigned to the same o assignee as the present invention. The method of forming the TMA form of the DB 199 dye forms no part of this invention.

Preferably, the cyan ink is prepared according to the following formulation and buffered to a pH of about 8:

(a) about 0.1 to 4 wt % of a mixture of Direct Blue 199-TMA and Acid Blue 9-Na, with Direct Blue 199-TMA more preferably present at about 2 to 3 wt % and Acid Blue 9-Na more preferably present at about 1 to 2 wt %, most preferably with the ratio by weight of Direct Blue 199 to Acid Blue 9 being about 2:1;

(b) a mixture of DEG and 1,5-pentanediol given by the formula

2×[DEG]+[pentanediol]=about 6 to 10 wt % and about 6 to 9 wt % ethylhydroxypropanediol (EHPD), with 1,5-pentanediol being more preferably present at about 7 to 9 wt % (and DEG absent) and most preferably about 7.5 to 8.5 wt %, and with EHPD being preferably present at about 7 to 8 wt % of the ink composition;

(c) about 3 to 9 wt % of 2-pyrrolidone, with about 6 to 9 wt % being more preferable and about 7 to 8 wt % being most preferable;

(d) about 3 to 6 wt % of a mixture of magnesium nitrate and/or calcium nitrate, with 4 to 5 wt % magnesium nitrate alone being more preferable;

(e) about 1 to 4 wt % of a mixture of Tergitol 15-S-5 and/or Tergitol 15-S-7, with Tergitol 15-S-5 being more preferably employed alone ranging from about 1.5 to 3 wt % or, most preferably, 1.5 to 2.5 wt %;

(f) up to about 0.4 wt % of Dowfax 8390 surfactant, with about 0.3 to 0.4 wt % being more preferable;

(g) about 0.1 to 1 wt % of a buffer, preferably Trizma Base or MES;

(h) up to about 1 wt % of a biocide, preferably PROXEL GXL; and (i) the balance water.

The magenta ink employed in the practice of the invention is formulated by combining purified Reactive Red 180 in its hydrolized form and purified Acid Red 52 anionic dye with an ink vehicle comprised of the above-described components and concentration ranges. The Acid Red 52 anionic dye is preferably treated to replace the as-supplied sodium cation with lithium. Preferably, the ratio of the concentration of Reactive Red 180 to the concentration of Acid Red 52 in the present magenta ink is about 1:1 by weight. Any of a variety of methods may be used to replace the sodium ion associated with Acid Red 52 with lithium, such as an ion-exchange process. The method of forming the lithium form of the dye forms no part of this invention.

Preferably, the magenta ink is prepared according to the following formulation and is buffered to a pH of about 7:

(a) about 0.1 to 4 wt % of a mixture of Reactive Red 180 and Acid Red 52-Li, with the ratio by weight of Reactive Red 180 to Acid Red 52 being more preferably about 1:1;

(b) a mixture of DEG and 1,5-pentanediol given by the formula

2×[DEG]+[pentanediol]=about 6 to 10 wt % and about 6 to 9 wt % ethylhydroxypropanediol (EHPD), with 1,5-pentanediol being more preferably present at about 7 to 9 wt % (and DEG absent) and most preferably about 7.5 to 8.5 wt %, and with EHPD being preferably present at k 5 about 7 to 8 wt % of the ink composition;

(c) about 3 to 9 wt % of 2-pyrrolidone, with about 6 to 9 wt % being more preferable and about 7 to 8 wt % being most preferable;

(d) about 3 to 6 wt % of a mixture of magnesium nitrate and/or calcium nitrate, with 4 to 5 wt % magnesium nitrate alone being more preferable;

(e) about 1 to 4 wt % of a mixture of Tergitol 15-S-5 and/or Tergitol 15-S-7, with Tergitol 15-S-5 being more preferably employed alone ranging from about 1.5 to 3 wt % or, most preferably, 1.5 to 2.5 wt %;

(f) up to about 0.4 wt % of Dowfax 8390 surfactant, with about 0.3 to 0.4 wt % being more preferable;

(g) about 0.1 to 1 wt % of a buffer, preferably Trizma base or MES;

(h) up to about 1 wt % of a biocide, preferably PROXEL GXL; and (i) the balance water.

The yellow ink employed in the practice of the invention is formulated by combining purified Acid Yellow 23 anionic dye with an ink vehicle comprising the above-described components and concentration ranges. The Acid Yellow 23 anionic dye is preferably treated to replace the as-supplied sodium cation with tetramethylammonium, which may be accomplished by a process such as ion-exchange. The method of forming the TMA form of the dye forms no part of this invention.

Preferably, the yellow ink is prepared according to the following formulation and buffered to a pH of about 6.5:

(a) about 0.1 to 4 wt % of Acid Yellow 23-TMA;

(b) a mixture of DEG and 1,5-pentanediol given by the formula

2×[DEG]+[pentanediol]=about 6 to 10 wt % and about 6 to 9 wt % ethylhydroxypropanediol, with the DEG being more preferably present in the mixture at about 3 to 5 wt % and most preferably about 3.5 to 4.5 wt %, and the ethylhydroxypropanediol being more preferably present at about 7.5 to 8.5 wt %;

(c) about 3 to 9 wt % of 2-pyrrolidone, with about 3 to 5 wt % being more preferable and about 3.5 to 4.5 wt % being most preferable;

(d) about 3 to 6 wt % of a mixture of magnesium nitrate and/or calcium nitrate, with 4 to 5 wt % calcium nitrate alone being more preferable;

(e) about 1 to 4 wt % of a mixture of Tergitol 15-S-5 and/or Tergitol 15-S-7, with a mixture of about 0.5 to 2 wt % Tergitol 15-S-5 and about 1 to 2 wt % Tergitol 15-S-7 being more preferable or, most preferably, a mixture of about 0.8 to 1.2 wt % Tergitol 15-S-5 and about 1.3 to 1.7 wt % Tergitol 15-S-7;

(f) up to about 0.4 wt % of Dowfax 8390 surfactant, with about 0.3 to 0.4 wt % being more preferable;

(g) about 0.1 to 1 wt % of a buffer, preferably Trizma base or MES;

(h) up to about 1 wt % of a biocide, preferably PROXEL GXL; and (i) the balance water.

Finally, the black ink employed in the present ink set may be any dye-based or a pigment-based ink that is suitably employed in thermal ink-jet printing. Suitable black dye-based inks are disclosed and claimed, for example, in U.S. Pat. No. 4,963,189, entitled "Waterfast Ink Formulations with a Novel Series of Anionic Dyes Containing Two or More Carboxyl Groups" and assigned to the present assignee. Suitable black pigment-based inks are disclosed and claimed, for example, in U.S. Pat. No. 5,085,698, entitled "Aqueous Pigmented Inks for Ink Jet Printers", in U.S. Pat. No. 5,221,334, entitled "Aqueous Pigmented Inks for Ink Jet Printers", and in U.S. Pat. No. 5,302,197, entitled "Ink Jet Inks", all assigned to E. I. Du Pont de Nemours and Company.

The advantages realized in the use of TMA-substituted Direct Blue 199 anionic dye with the present dye set are illustrated by the following example.

EXAMPLE

A comparison of the crusting observed for cyan inks having different associated cations in equal mole percentages was performed. More specifically, three inks were tested that were identical in formulation with the exception that the Direct Blue 199 dyes of Inks 1, 2, and 3 were respectively associated sodium, lithium, and tetramethylammonium cations. In each ink, DB 199 dye was employed in the absence of AB 9 dye and at the highest acceptable dye concentration to maximize the potential for crusting and to therefore better assess the value of replacing undesirable cations with TMA. The ink formulation employed follows in Table I:

TABLE I

FORMULATIONS OF TESTED INKS

| Component | Wt % of Ink |
| --- | --- |
| Direct Blue 199 dye | 4.0 |
| ethylhydroxypropanediol | 7.5 |
| 2-pyrrolidone | 7.5 |
| 1,5 pentanediol | 8.0 |
| $Mg(NO_3)_2 \cdot 6H_2O$ | 8.0 |
| Tergitol 15-S-5 | 2.25 |
| Trizma Base | 0.2 |
| Water | Balance |

A conventional crusting test was performed on 100 grams of each ink placed in three separate identical pens which were then pulse warmed. The test was conducted by firing each nozzle, waving the pen back and forth without firing for increments of x seconds, then firing each nozzle again. Following the test, the print was examined to determine how many seconds of idle pen time elapsed before the first misdirected drop occurred. The results of the crusting test were as follows:

TABLE II

CRUSTING RESULTS (sec)

| INK 1 (DB 199-Na) | 15 |
| --- | --- |
| INK 2 (DB 199-Li) | 25 |
| INK 3 (DB 199-TMA) | 30 |

The results indicate that Ink 3, which contained Direct Blue 199 associated with tetramethylammonium, exhibited the longest period of time before the first misdirected drop occurred due to crusting. Thus, it has been demonstrated that a cyan ink containing Direct Blue 199 benefits by the replacement of sodium and other undesirable cations with the tetramethylammonium cation.

INDUSTRIAL APPLICABILITY

The specific dye set disclosed herein is expected to find commercial use in thermal ink-jet color printers.

Thus, there has been disclosed a specific dye set for use in thermal ink-jet color printing. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. A set of thermal ink-jet inks for thermal ink-jet priming including a cyan ink containing cyan dye and the balance vehicle, said vehicle comprising at least one inorganic salt ranging from about 3 to 11 wt % of said cyan ink and said cyan dye comprising Direct Blue 199 anionic dye associated with tetramethylammonium cation, wherein said association of said tetramethylammonium cation with said Direct Blue 199 anionic dye serves to reduce crusting of said cyan ink and to maintain solubility of said Direct Blue 199 anionic dye in the presence of said at least one inorganic salt in said vehicle.

2. The set of thermal ink-jet inks of claim 1 wherein said cyan dye further comprises Acid Blue 9 anionic dye, with the ratio of Direct Blue 199 anionic dye to Acid Blue 9 anionic dye in said cyan dye being about 2:1 by weight.

3. The set of thermal ink-jet inks of claim 1 further including a yellow ink, a magenta ink, and a black ink, wherein:

(a) said magenta ink comprises a mixture of Reactive Red 180 dye and Acid Red 52 anionic dye and the balance vehicle;

(b) said yellow ink comprises Acid Yellow 23 anionic dye and the balance vehicle; and (c) said black ink comprises at least one pigmented dye and the balance vehicle.

4. The set of thermal ink-jet inks of claim 3 wherein each of said cyan, magenta, and yellow inks comprises:

(a) about 0.1 to 4 wt % of at least one dye;

(b) about 3 to 20 wt % of at least one diol;

(c) 0 to about 5 wt % of at least one glycol ether;

(d) about 3 to 9 wt % of 2-pyrrolidone;

(e) about 0.5 to 5 wt % of at least one component selected from the group consisting of surfactants, buffers, and biocides;

(f) about 3 to 11 wt % of at least one inorganic salt; and (g) the balance water.

5. The set of thermal ink-jet inks of claim 4 wherein: said cyan ink has the formula (a) about 0.1 to 4 wt % of a mixture of Direct Blue 199 anionic dye and Acid Blue 9 anionic dye, (b) about 6 to 10 wt % of a solvent selected from the group consisting of 1,5-pentanediol, diethylene glycol, and mixtures thereof, wherein said mixtures have the formula 2×(wt % diethylene glycol)+(wt % 1,5-pentanediol)=(wt % solvent), (c) about 6 to 9 wt % ethylhydroxypropanediol, (d) about 3 to 9 wt % of 2-pyrrolidone, (e) about 3 to 6 wt % of at least one inorganic salt selected from the group consisting of magnesium nitrate and calcium nitrate, (f) about 1 to 4 wt % of at least one secondary alcohol ethoxylate surfactant predominantly having about 4 to 8 ethoxylated units and an aliphatic chain of about 12 to 18 carbon atoms, (g) up to about 0.4 wt % of at least one diphenyl sulfonate derivative surfactant, (h) about 0.1 to 1 wt % of a buffer, (i) up to about 1 wt % of a biocide, and (j) the balance water; said magenta ink has the formula (a) about 0.1 to 4 wt % of said mixture of Reactive Red 180 and Acid Red 52 anionic dye, (b) about 6 to 10 wt % of a solvent selected from the group consisting of 1,5-pentanediol, diethylene glycol, and mixtures thereof, wherein said mixtures have the formula 2×(wt % diethylene glycol)+(wt % 1,5-pentanediol)=(wt % solvent), (c) about 6 to 9 wt % ethylhydroxypropanediol, (d) about 3 to 9 wt % of 2-pyrrolidone, (e) about 3 to 6 wt % of at least one inorganic salt selected from the group consisting of magnesium nitrate and calcium nitrate, (f) about 1 to 4 wt % of at least one secondary alcohol ethoxylate surfactant predominantly having about 4 to 8 ethoxylated units and an aliphatic chain of about 12 to 18 carbon atoms, (g) up to about 0.4 wt % of at least one diphenyl sulfonate derivative surfactant, (h) about 0.1 to 1 wt % of a buffer, (i) up to about 1 wt % of a biocide, and (j) the balance water; and said yellow ink has the formula (a) about 0.1 to 4 wt % of said Acid Yellow 23 anionic dye, (b) about 6 to 10 wt % of a solvent selected from the group consisting of 1,5-pentanediol, diethylene glycol, and mixtures thereof, wherein said mixtures have the formula 2×(wt % diethylene glycol)+(wt % 1,5-pentanediol)=(wt % solvent), (c) about 6 to 9 wt % ethylhydroxypropanediol, (d) about 3 to 9 wt % of 2-pyrrolidone, (e) about 3 to 6 wt % of at least one inorganic salt selected from the group consisting of magnesium nitrate and calcium nitrate, (f) about 1 to 4 wt % of at least one secondary alcohol ethoxylate surfactant predominantly having about 4 to 8 ethoxylated units and an aliphatic chain of about 12 to 18 carbon atoms, (g) up to about 0.4 wt % of at least one diphenyl sulfonate derivative surfactant, (h) about 0.1 to 1 wt % of a buffer, (i) up to about 1 wt % of a biocide, and (j) the balance water.

6. The set of thermal ink-jet inks of claim 5 wherein: said cyan ink has the formula (a) about 0.1 to 4 wt % of a mixture of Direct Blue 199 anionic dye and Acid Blue 9 anionic dye, wherein said Direct Blue 199 anionic dye ranges from about 2 to 3 wt % and said Acid Blue 9 ranges from about 1 to 2 wt %, (b) about 7 to 9 wt % 1,5-pentanediol, (c) about 7 to 8 wt % ethylhydroxypropanediol, (d) about 6 to 9 wt % 2-pyrrolidone, (e) about 4 to 5 wt % magnesium nitrate, (f) about 1.5 to 3 wt % of a secondary alcohol ethoxylate surfactant predominantly having about 5 ethoxylated units and an aliphatic chain of about 15 carbon atoms, (g) about 0.3 to 0.4 wt % of at least one diphenyl sulfonate derivative surfactant, (h) about 0.1 to 1 wt % of a buffer, (i) up to about 1 wt % of a biocide, and (j) the balance water; said magenta ink has the formula (a) about 0.1 to 4 wt % of said mixture of Reactive Red 180 and Acid Red 52 anionic dye, wherein the ratio of Reactive Red 180 to Acid Red 52 anionic dye is about 1:1 by weight, (b) about 7 to 9 wt % 1,5-pentanediol, (c) about 7 to 8 wt % ethylhydroxypropanediol, (d) about 6 to 9 wt % of 2-pyrrolidone, (e) about 4 to 5 wt % magnesium nitrate, (f) about 1.5 to 3 wt % of a secondary alcohol ethoxylate surfactant predominantly having about 5 ethoxylated units and an aliphatic chain of about 15 carbon atoms, (g) about 0.3 to 0.4 wt % of at least one diphenyl sulfonate derivative surfactant, (h) about 0.1 to 1 wt % of a buffer, (i) up to about 1 wt % of a biocide, and (j) the balance water; and said yellow ink has the formula (a) about 0.1 to 4 wt % of said Acid Yellow 23 anionic dye, (b) about 3 to 5 wt % diethylene glycol, (c) about 7.5 to 8.5 wt % ethylhydroxypropanediol, (d) about 3 to 5 wt % of 2-pyrrolidone, (e) about 4 to 5 wt % calcium nitrate, (f) about 0.5 to 2 wt % of a secondary alcohol ethoxylate surfactant predominantly having about 5 ethoxylated units and an aliphatic chain of about 15 carbon atoms and about 1 to 2 wt % of a secondary alcohol ethoxylate surfactant predominantly having about 7 ethoxylated units and an aliphatic chain of about 15 carbon atoms, (g) about 0.3 to 0.4 wt % of at least one diphenyl sulfonate derivative surfactant, (h) about 0.1 to 1 wt % of a buffer, (i) up to about 1 wt % of a biocide, and (j) the balance water.

7. A set of thermal ink-jet inks for thermal ink-jet printing comprising:

(a) a cyan ink containing cyan dye comprising Direct Blue 199 anionic dye and Acid Blue 9 anionic dye, said Direct Blue 199 anionic dye being associated with tetramethylammonium cation and said Acid Blue 9 anionic dye being associated with sodium cation;

(b) a magenta ink containing magenta dye comprising a mixture of Reactive Red 180 dye and Acid Red 52 anionic dye, said Reactive Red 180 dye being hydrolyzed and said Acid Red 52 anionic dye associated with lithium cation;

(c) a yellow ink containing yellow dye comprising Acid Yellow 23 anionic dye associated with tetramethylammonium cation; and (d) a black ink containing pigmented dye;

wherein each of said cyan, magenta, and yellow inks comprises about 0.1 to 4 wt % of at least one dye; about 3 to 20 wt % of at least one diol; 0 to about 5 wt % of at least one glycol ether; about 3 to 9 wt % of 2-pyrrolidone; about 0.5 to 5 wt % of at least one component selected from the group consisting of surfactants, buffers, and biocides; about 3 to 11 wt % of at least one inorganic salt; and the balance water.

8. The set of thermal ink-jet inks of claim 7 wherein the ratio of Direct Blue anionic dye to Acid Blue 9 anionic dye in said cyan dye is about 2:1 by weight and the ratio of Reactive Red 180 dye to Acid Red 52 anionic dye in said magenta dye is about 1:1 by weight.

9. The set of thermal ink-jet inks of claim 7 wherein: said cyan ink has the formula (a) about 0.1 to 4 wt % of said cyan dye, (b) about 6 to 10 wt % of a solvent selected from the group consisting of 1,5-pentanediol, diethylene glycol, and mixtures thereof, wherein said mixtures have the formula 2×(wt % diethylene glycol)+(wt % 1,5-pentanediol)=(wt % solvent), (c) about 6 to 9 wt % ethylhydroxypropanediol,
(d) about 3 to 9 wt % of 2-pyrrolidone,
(e) about 3 to 6 wt % of at least one inorganic salt selected from the group consisting of magnesium nitrate and calcium nitrate,
(f) about 1 to 4 wt % of at least one secondary alcohol ethoxylate surfactant predominantly having 4 to 8 ethoxylated units and an aliphatic chain of about 12 to 18 carbon atoms,
(g) up to about 0.4 wt % of at least one diphenyl sulfonate derivative surfactant,
(h) about 0.1 to 1 wt % of a buffer,
(i) up to about 1 wt % of a biocide, and
(j) the balance water; said magenta ink has the formula
(a) about 0.1 to 4 wt % of said magenta dye,
(b) about 6 to 10 wt % of a solvent selected from the group consisting of 1,5-pentanediol, diethylene glycol, and mixtures thereof, wherein said mixtures have the formula
2×(wt % diethylene glycol)+(wt % 1,5-pentanediol)=(wt % solvent),
(c) about 6 to 9 wt % ethylhydroxypropanediol,
(d) about 3 to 9 wt % of 2-pyrrolidone,
(e) about 3 to 6 wt % of at least one inorganic salt selected from the group consisting of magnesium nitrate and calcium nitrate,
(f) about 1 to 4 wt % of at least one secondary alcohol ethoxylate surfactant predominantly having 4 to 8 ethoxylated units and an aliphatic chain of about 12 to 18 carbon atoms,
(g) up to about 0.4 wt % of at least one diphenyl sulfonate derivative surfactant,
(h) about 0.1 to 1 wt % of a buffer,
(i) up to about 1 wt % of a biocide, and
(j) the balance water; and said yellow ink has the formula
(a) about 0.1 to 4 wt % of said yellow dye,
(b) about 6 to 10 wt % of a solvent selected from the group consisting of 1,5-pentanediol, diethylene glycol, and mixtures thereof, wherein said mixtures have the formula
2×(wt % diethylene glycol)+(wt % 1,5-pentanediol)=(wt % solvent),
(c) about 6 to 9 wt % ethylhydroxypropanediol,
(d) about 3 to 9 wt % of 2-pyrrolidone,
(e) about 3 to 6 wt % of at least one inorganic salt selected from the group consisting of magnesium nitrate and calcium nitrate,
(f) about 1 to 4 wt % of at least one secondary alcohol ethoxylate surfactant predominantly having 4 to 8 ethoxylated units and an aliphatic chain of about 12 to 18 carbon atoms,
(g) up to about 0.4 wt % of at least one diphenyl sulfonate derivative surfactant,
(h) about 0.1 to 1 wt % of a buffer,
(i) up to about 1 wt % of a biocide, and
(j) the balance water.

10. The set of thermal ink-jet inks of claim 9 wherein: said cyan ink has the formula
(a) about 0.1 to 4 wt % of said cyan dye, wherein said Direct Blue 199 anionic dye ranges from about 2 to 3 wt % and said Acid Blue 9 ranges from about 1 to 2 wt %,
(b) about 7 to 9 wt % 1,5-pentanediol,
(c) about 7 to 8 wt % ethylhydroxypropanediol,
(d) about 6 to 9 wt % 2-pyrrolidone,
(e) about 4 to 5 wt % magnesium nitrate,
(f) about 1.5 to 3 wt % of a secondary alcohol ethoxylate surfactant predominantly having about 5 ethoxylated units and an aliphatic chain of about 15 carbon atoms,
(g) about 0.3 to 0.4 wt % of at least one diphenyl sulfonate derivative surfactant,
(h) about 0.1 to 1 wt % of a buffer, (i) up to about 1 wt % of a biocide, and (j) the balance water; said magenta ink has the formula
(a) about 0.1 to 4 wt % of said magenta dye, wherein the ratio of Reactive Red 180 to Acid Red 52 anionic dye is about 1:1 by weight,
(b) about 7 to 9 wt % 1,5-pentanediol,
(c) about 7 to 8 wt % ethylhydroxypropanediol,
(d) about 6 to 9 wt % of 2-pyrrolidone,
(e) about 4 to 5 wt % magnesium nitrate,
(f) about 1.5 to 3 wt % of a secondary alcohol ethoxylate surfactant predominantly having about 5 ethoxylated units and an aliphatic chain of about 15 carbon atoms,
(g) about 0.3 to 0.4 wt % of at least one diphenyl sulfonate derivative surfactant,
(h) about 0.1 to 1 wt % of a buffer,
(i) up to about 1 wt % of a biocide, and
(j) the balance water; and said yellow ink has the formula
(a) about 0.1 to 4 wt % of said yellow dye,
(b) about 3 to 5 wt % diethylene glycol,
(c) about 7.5 to 8.5 wt % ethylhydroxypropanediol,
(d) about 3 to 5 wt % of 2-pyrrolidone,
(e) about 4 to 5 wt % calcium nitrate,
(f) about 0.5 to 2 wt % of a secondary alcohol ethoxylate surfactant predominantly having about 5 ethoxylated units and an aliphatic chain of about 15 carbon atoms and about 1 to 2 wt % of a secondary alcohol ethoxylate surfactant predominantly having about 7 ethoxylated units and an aliphatic chain of about 15 carbon atoms,
(g) about 0.3 to 0.4 wt % of at least one diphenyl sulfonate derivative surfactant,
(h) about 0.1 to 1 wt % of a buffer,
(i) up to about 1 wt % of a biocide, and
(j) the balance water.

11. A method for color-printing using a thermal ink-jet primer, comprising priming from a set of thermal ink-jet inks including a cyan ink containing cyan dye and the balance vehicle, said vehicle comprising at least one inorganic salt ranging from about 3 to 11 wt % of said cyan ink and said cyan dye comprising Direct Blue 199 anionic dye associated with tetramethylammonium cation, wherein said association of said tetramethylammonium cation with said Direct Blue 199 anionic dye serves to reduce crusting of said cyan ink and to maintain solubility of said Direct Blue 199 anionic dye in the presence of said at least one inorganic salt in said vehicle.

12. The method of claim 11 wherein said cyan dye further comprises Acid Blue 9 anionic dye, with the ratio of Direct Blue 199 anionic dye to Acid Blue 9 anionic dye in said cyan dye being about 2:1 by weight.

13. The method of claim 11 wherein said set of thermal ink-jet inks further includes a yellow ink, a magenta ink, and a black ink, wherein:

(a) said magenta ink comprises a mixture of Reactive Red 180 dye and Acid Red 52 anionic dye and the balance vehicle;

(b) said yellow ink comprises Acid Yellow 23 anionic dye and the balance vehicle; and (c) said black ink comprises at least one pigmented dye and the balance vehicle.

14. The method of claim 13 wherein each of said cyan, magenta, and yellow inks comprises:

(a) about 0.1 to 4 wt % of at least one dye;

(b) about 3 to 20 wt % of at least one diol;

(c) 0 to about 5 wt % of at least one glycol ether;

(d) about 3 to 9 wt % of 2-pyrrolidone;

(e) about 0.5 to 5 wt % of at least one component selected from the group consisting of surfactants, buffers, and biocides;

(f) about 3 to 11 wt % of at least one inorganic salt; and (g) the balance water.

15. The method of claim 14 wherein: said cyan ink has the formula (a) about 0.1 to 4 wt % of a mixture of Direct Blue 199 anionic dye and Acid Blue 9 anionic dye, (b) about 6 to 10 wt % of a solvent selected from the group consisting of 1,5-pentanediol, diethylene glycol, and mixtures thereof, wherein said mixtures have the formula $2 \times ($wt % diethylene glycol$) + ($wt % 1,5-pentanediol$) = ($wt % solvent$)$, (c) about 6 to 9 wt % ethylhydroxypropanediol, (d) about 3 to 9 wt % of 2-pyrrolidone, (e) about 3 to 6 wt % of at least one inorganic salt selected from the group consisting of magnesium nitrate and calcium nitrate, (f) about 1 to 4 wt % of at least one secondary alcohol ethoxylate surfactant predominantly having 4 to 8 ethoxylated units and an aliphatic chain of about 12 to 18 carbon atoms, (g) up to about 0.4 wt % of at least one diphenyl sulfonate derivative surfactant, (h) about 0.1 to 1 wt % of a buffer, (i) up to about 1 wt % of a biocide, and (j) the balance water; said magenta ink has the formula (a) about 0.1 to 4 wt % of said mixture of Reactive Red 180 and Acid Red 52 anionic dye, (b) about 6 to 10 wt % of a solvent selected from the group consisting of 1,5-pentanediol, diethylene glycol, and mixtures thereof, wherein said mixtures have the formula $2 \times ($wt % diethylene glycol$) + ($wt % 1,5-pentanediol$) = ($wt % solvent$)$, (c) about 6 to 9 wt % ethylhydroxypropanediol, (d) about 3 to 9 wt % of 2-pyrrolidone, (e) about 3 to 6 wt % of at least one inorganic salt selected from the group consisting of magnesium nitrate and calcium nitrate, (f) about 1 to 4 wt % of at least one secondary alcohol ethoxylate surfactant predominantly having 4 to 8 ethoxylated units and an aliphatic chain of about 12 to 18 carbon atoms, (g) up to about 0.4 wt % of at least one diphenyl sulfonate derivative surfactant, (h) about 0.1 to 1 wt % of a buffer, (i) up to about 1 wt % of a biocide, and (j) the balance water; and said yellow ink has the formula (a) about 0.1 to 4 wt % of said Acid Yellow 23 anionic dye, (b) about 6 to 10 wt % of a solvent selected from the group consisting of 1,5-pentanediol, diethylene glycol, and mixtures thereof, wherein said mixtures have the formula $2 \times ($wt % diethylene glycol$) + ($wt % 1,5-pentanediol$) = ($wt % solvent$)$, (c) about 6 to 9 wt % ethylhydroxypropanediol, (d) about 3 to 9 wt % of 2-pyrrolidone, (e) about 3 to 6 wt % of at least one inorganic salt selected from the group consisting of magnesium nitrate and calcium nitrate, (f) about 1 to 4 wt % of at least one secondary alcohol ethoxylate surfactant predominantly having 4 to 8 ethoxylated units and an aliphatic chain of about 12 to 18 carbon atoms, (g) up to about 0.4 wt % of at least one diphenyl sulfonate derivative surfactant, (h) about 0.1 to 1 wt % of a buffer, (i) up to about 1 wt % of a biocide, and (j) the balance water.

16. The method of claim 15 wherein: said cyan ink has the formula (a) about 0.1 to 4 wt % of a mixture of Direct Blue 199 anionic dye and Acid Blue 9 anionic dye, wherein said Direct Blue 199 anionic dye ranges from about 2 to 3 wt % and said Acid Blue 9 ranges from about 1 to 2 wt %, (b) about 7 to 9 wt % 1,5-pentanediol, (c) about 7 to 8 wt % ethylhydroxypropanediol, (d) about 6 to 9 wt % 2-pyrrolidone, (e) about 4 to 5 wt % magnesium nitrate, (f) about 1.5 to 3 wt % of a secondary alcohol ethoxylate surfactant predominantly having about 5 ethoxylated units and an aliphatic chain of about 15 carbon atoms, (g) about 0.3 to 0.4 wt % of at least one diphenyl sulfonate derivative surfactant, (h) about 0.1 to 1 wt % of a buffer, (i) up to about 1 wt % of a biocide, and (j) the balance water; said magenta ink has the formula (a) about 0.1 to 4 wt % of said mixture of Reactive Red 180 and Acid Red 52 anionic dye, wherein the ratio of Reactive Red 180 to Acid Red 52 anionic dye is about 1:1 by weight, (b) about 7 to 9 wt % 1,5-pentanediol, (c) about 7 to 8 wt % ethylhydroxypropanediol, (d) about 6 to 9 wt % of 2-pyrrolidone, (e) about 4 to 5 wt % magnesium nitrate, (f) about 1.5 to 3 wt % of a secondary alcohol ethoxylate surfactant predominantly having about 5 ethoxylated units and an aliphatic chain of about 15 carbon atoms, (g) about 0.3 to 0.4 wt % of at least one diphenyl sulfonate derivative surfactant, (h) about 0.1 to 1 wt % of a buffer, (i) up to about 1 wt % of a biocide, and (j) the balance water; and said yellow ink has the formula (a) about 0.1 to 4 wt % of said Acid Yellow 23 anionic dye, (b) about 3 to 5 wt % diethylene glycol,
(c) about 7.5 to 8.5 wt % ethylhydroxypropanediol,
(d) about 3 to 5 wt % of 2-pyrrolidone,
(e) about 4 to 5 wt % calcium nitrate,
(f) about 0.5 to 2 wt % of a secondary alcohol ethoxylate surfactant predominantly having about 5 ethoxylated units and an aliphatic chain of about 15 carbon atoms and about 1 to 2 wt % of a secondary alcohol ethoxylate surfactant predominantly having about 7 ethoxylated units and an aliphatic chain of about 15 carbon atoms,
(g) about 0.3 to 0.4 wt % of at least one diphenyl sulfonate derivative surfactant,
(h) about 0.1 to 1 wt % of a buffer,
(i) up to about 1 wt % of a biocide, and
(j) the balance water.

17. A method for color-printing using a thermal ink-jet primer, comprising printing from a set of thermal ink-jet inks comprising:
(a) a cyan ink containing cyan dye comprising Direct Blue 199 anionic dye and Acid Blue 9 anionic dye, said Direct Blue 199 anionic dye being associated with tetramethylammonium cation and said Acid Blue 9 anionic dye being associated with sodium cation;
(b) a magenta ink containing magenta dye comprising a mixture of Reactive Red 180 dye and Acid Red 52 anionic dye, said Reactive Red 180 dye being hydrolyzed and said Acid Red 52 anionic dye associated with lithium cation; and
(c) a yellow ink containing yellow dye comprising Acid Yellow 23 anionic dye associated with tetramethylammonium cation;
(d) a black ink containing pigmented dye; wherein each of said cyan, magenta, and yellow inks comprises about 0.1 to 4 wt % of at least one dye; about 3 to 20 wt % of at least one diol; 0 to about 5 wt % of at least one glycol ether; about 3 to 9 wt % of 2-pyrrolidone; about 0.5 to 5 wt % of at least one component selected from the group consisting of surfactants, buffers, and biocides; about 3 to 11 wt % of at least one inorganic salt; and the balance water.

18. The method of claim 17 wherein the ratio of Direct Blue 199 anionic dye to Acid Blue 9 anionic dye in said cyan dye is about 2:1 by weight and the ratio of Reactive Red 180 dye to Acid Red 52 anionic dye in said magenta dye is about 1:1 by weight.

19. The method of claim 17 wherein: said cyan ink has the formula
(a) about 0.1 to 4 wt % of said cyan dye,
(b) about 6 to 10 wt % of a solvent selected from the group consisting of 1,5-pentanediol, diethylene glycol, and mixtures thereof, wherein said mixtures have the formula
2×(wt % diethylene glycol)+(wt % 1,5-pentanediol)=(wt % solvent),
(c) about 6 to 9 wt % ethylhydroxypropanediol,
(d) about 3 to 9 wt % of 2-pyrrolidone,
(e) about 3 to 6 wt % of at least one inorganic salt selected from the group consisting of magnesium nitrate and calcium nitrate,
(f) about 1 to 4 wt % of at least one secondary alcohol ethoxylate surfactant predominantly having 4 to 8 ethoxylated units and an aliphatic chain of about 12 to 18 carbon atoms,
(g) up to about 0.4 wt % of at least one diphenyl sulfonate derivative surfactant,
(h) about 0.1 to 1 wt % of a buffer,
(i) up to about 1 wt % of a biocide, and
(j) the balance water; said magenta ink has the formula
(a) about 0.1 to 4 wt % of said magenta dye,
(b) about 6 to 10 wt % of a solvent selected from the group consisting of 1,5-pentanediol, diethylene glycol, and mixtures thereof, wherein said mixtures have the formula
2×(wt % diethylene glycol)+(wt % 1,5-pentanediol)=(wt % solvent),
(c) about 6 to 9 wt % ethylhydroxypropanediol,
(d) about 3 to 9 wt % of 2-pyrrolidone,
(e) about 3 to 6 wt % of at least one inorganic salt selected from the group consisting of magnesium nitrate and calcium nitrate,
(f) about 1 to 4 wt % of at least one secondary alcohol ethoxylate surfactant predominantly having 4 to 8 ethoxylated units and an aliphatic chain of about 12 to 18 carbon atoms,
(g) up to about 0.4 wt % of at least one diphenyl sulfonate derivative surfactant,
(h) about 0.1 to 1 wt % of a buffer,
(i) up to about 1 wt % of a biocide, and
(j) the balance water; and said yellow ink has the formula
(a) about 0.1 to 4 wt % of said yellow dye,
(b) about 6 to 10 wt % of a solvent selected from the group consisting of 1,5-pentanediol, diethylene glycol, and mixtures thereof, wherein said mixtures have the formula
2×(wt % diethylene glycol)+(wt % 1,5-pentanediol)=(wt % solvent),
(c) about 6 to 9 wt % ethylhydroxypropanediol,
(d) about 3 to 9 wt % of 2-pyrrolidone,
(e) about 3 to 6 wt % of at least one inorganic salt selected from the group consisting of magnesium nitrate and calcium nitrate,
(f) about 1 to 4 wt % of at least one secondary alcohol ethoxylate surfactant predominantly having 4 to 8 ethoxylated units and an aliphatic chain of about 12 to 18 carbon atoms,
(g) up to about 0.4 wt % of at least one diphenyl sulfonate derivative surfactant,
(h) about 0.1 to 1 wt % of a buffer,
(i) up to about 1 wt % of a biocide, and
(j) the balance water.

20. The method of claim 19 wherein: said cyan ink has the formula
(a) about 0.1 to 4 wt % of said cyan dye, wherein said Direct Blue 199 anionic dye ranges from about 2 to 3 wt % and said Acid Blue 9 ranges from about 1 to 2 wt %,
(b) about 7 to 9 wt % 1,5-pentanediol,
(c) about 7 to 8 wt % ethylhydroxypropanediol,
(d) about 6 to 9 wt % 2-pyrrolidone,
(e) about 4 to 5 wt % magnesium nitrate,
(f) about 1.5 to 3 wt % of a secondary alcohol ethoxylate surfactant predominantly having about 5 ethoxylated units and an aliphatic chain of about 15 carbon atoms,
(g) about 0.3 to 0.4 wt % of at least one diphenyl sulfonate derivative surfactant,
(h) about 0.1 to 1 wt % of a buffer, (i) up to about 1 wt % of a biocide, and
(j) the balance water; said magenta ink has the formula
(a) about 0.1 to 4 wt % of said magenta dye, wherein the ratio of Reactive Red 180 to Acid Red 52 anionic dye is about 1:1 by weight,
(b) about 7 to 9 wt % 1,5-pentanediol,
(c) about 7 to 8 wt % ethylhydroxypropanediol,
(d) about 6 to 9 wt % of 2-pyrrolidone,
(e) about 4 to 5 wt % magnesium nitrate,
(f) about 1.5 to 3 wt % of a secondary alcohol ethoxylate surfactant predominantly having about 5 ethoxylated units and an aliphatic chain of about 15 carbon atoms,
(g) about 0.3 to 0.4 wt % of at least one diphenyl sulfonate derivative surfactant,
(h) about 0.1 to 1 wt % of a buffer,
(i) up to about 1 wt % of a biocide, and
(j) the balance water; and said yellow ink has the formula
(a) about 0.1 to 4 wt % of said yellow dye,
(b) about 3 to 5 wt % diethylene glycol,
(c) about 7.5 to 8.5 wt % ethylhydroxypropanediol,
(d) about 3 to 5 wt % of 2-pyrrolidone,
(e) about 4 to 5 wt % calcium nitrate,
(f) about 0.5 to 2 wt % of a secondary alcohol ethoxylate surfactant predominantly having about 5 ethoxylated units and an aliphatic chain of about 15 carbon atoms and about 1 to 2 wt % of a secondary alcohol ethoxylate surfactant predominantly having about 7 ethoxylated units and an aliphatic chain of about 15 carbon atoms,
(g) about 0.3 to 0.4 wt % of at least one diphenyl sulfonate derivative surfactant,
(h) about 0.1 to 1 wt % of a buffer,
(i) up to about 1 wt % of a biocide, and
(j) the balance water.

* * * * *